(12) United States Patent
Okubo et al.

(10) Patent No.: US 7,621,514 B2
(45) Date of Patent: Nov. 24, 2009

(54) CLAMPING APPARATUS

(75) Inventors: Ryu Okubo, Hagagun (JP); Toshihiko Aoki, Tokyo (JP); Hiromi Ohshima, Hagagun (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 11/279,468

(22) Filed: Apr. 12, 2006

(65) Prior Publication Data

US 2006/0261532 A1   Nov. 23, 2006

(30) Foreign Application Priority Data

Apr. 15, 2005   (JP)   ............................. 2005-118017

(51) Int. Cl.
*B23Q 3/08* (2006.01)
(52) U.S. Cl. .............................. 269/24; 269/32; 269/20
(58) Field of Classification Search .................. 269/32, 269/24, 27, 91, 93, 20, 291
See application file for complete search history.

(56) References Cited

U.S. PATENT DOCUMENTS

| 4,351,516 A * | 9/1982 | Ersoy et al. .................... 269/27 |
| 5,201,501 A * | 4/1993 | Fassler .......................... 269/32 |
| 5,876,025 A * | 3/1999 | Yonezawa .................... 269/24 |
| 6,427,992 B1 * | 8/2002 | Noda et al. .................... 269/24 |
| 6,663,093 B2 * | 12/2003 | Yonezawa et al. ............. 269/24 |
| 6,736,384 B2 * | 5/2004 | Yokota ........................ 269/32 |
| 2003/0189279 A1 * | 10/2003 | Yonezawa et al. ............. 269/24 |
| 2006/0261532 A1 * | 11/2006 | Okubo et al. ................. 269/24 |

FOREIGN PATENT DOCUMENTS

| EP | 0913587 | 10/2001 |
| GB | 1284494 | 8/1972 |
| JP | 02-074135 | 6/1990 |
| JP | 10-109240 | 4/1998 |
| JP | 11-170133 | 6/1999 |
| JP | 2003-039263 | 2/2003 |
| JP | 2004-001164 | 1/2004 |

* cited by examiner

*Primary Examiner*—Lee D Wilson
(74) *Attorney, Agent, or Firm*—Rankin, Hill & Clark LLP

(57) ABSTRACT

A clamping apparatus detachably clamps a work on a pallet. When a second pressing plate moves down from the unclamped state of a first position, elastic force of a first elastic member acts on a shaft through a first retainer and first operating balls so that a clamping arm is pressed down. When a first pressing plate moves down by a short distance, the first operating balls shift to the position of an unlocking segment of a sleeve, and a second operating balls are also located at an unlocking segment of a clamping case, to realize a releasing position. When the shaft is located at the releasing position where the first and second operating balls are not engaged with the shaft, the shaft can be removed from the clamping case.

10 Claims, 4 Drawing Sheets

CLAMPING APPARATUS

The present application claims foreign priority based on Japanese Patent Application No. P.2005-118017, filed on Apr. 15, 2005, the contents of which are incorporated herein by reference.

BACKGROUND OF THE INVENTION

1. Field of the Invention

This invention relates to a clamping apparatus capable of temporarily firmly holding a work on e.g. a pallet in machining the work such as a cylinder block of an internal combustion engine and capable of easily releasing the work from the pallet after it has been machined.

2. Related Art

On a machining line of the work such as the cylinder block employed in the internal combustion engine of a motor vehicle, a transfer line is used in which a plurality of p processing machines arranged in order of machining steps are coupled by transfer devices and the work is transferred in order of the machining steps. On this transfer line, by fixing the work on the pallet and moving the pallet on the transfer line, the work is transferred in order of the machining steps and machined by the machining devices. In fixing the work on the pallet, a fluid-pressure spring clamping has been conventionally used which serves to detachably hold the work using oil pressure and spring elastic force.

Disclosed in JP-A-11-170133 is a conventional fluid-pressure spring clamping apparatus. The clamping apparatus includes a cylindrical piston member which vertically moves in a short stroke within a cylindrical clamping body, an output shaft which vertically moves in a long stroke within the piston member and projects from the clamping body, and a clamping arm attached to the tip of the output shaft and serving to clamp the work. Further, between the piston member and the clamping body, a tough spring member with a short stroke is arranged so that the piston member is urged in a direction of strongly clamping the work by the clamping arm through the output shaft. Further, between the output shaft and the piston member, a weak spring member with a long stroke is arranged.

Between the piston member and the output shaft, a locking mechanism is provided. Thus, in the vicinity of the position where the clamping arm clamps the work, the piston member and output shaft are locked by each other so that they are integrally moved within the clamping body. On the other hand, when the clamping arm leaves the clamping position of the work by a predetermined distance, the locking mechanism is unlocked so that the output shaft can be moved greatly within the piston member.

Between the clamping body, and the piston member and output shaft, a space filled with an operating oil is provided. By externally supplying or discharging the operating oil, the oil pressure can be exerted on the piston member and output shaft within the clamping body.

In the clamping apparatus of JP-A-11-170133, in releasing the clamping of the work, the operating oil is supplied to between the clamping body, and the piston member and output shaft so that the clamping is released by the oil pressure. In this case, the piston member and output shaft coupled with each other by the locking mechanism are integrally moved so that the above tough spring member is contracted to separate the clamping arm from the work by the short stroke. Next, the locking mechanism is unlocked so that only the output shaft is stroked within the piston member while the weak spring member is contracted by the oil pressure. Thus, the clamping arm is greatly separated from the work.

On the other hand, the work to be machined on the transfer line has different shapes and sizes according to car models when the work is the cylinder block for the internal combustion engine. So, the clamping position or moving direction of the clamping arm differs according to the height of the work clamping position from the pallet and its horizontal position, or the shape of the work around the clamping position.

In the clamping apparatus of JP-A-11-170133, however, because of the configuration described above, the clamping arm, piston member and output shaft cannot be easily dismantled. Therefore, when the work is replaced by another work, only the measure such as replacing the clamping arm can be taken. In this case, since the length of the output shaft remains unchanged, the great change in the clamping position in the height direction can be dealt with. In some clamping apparatuses, in separating the clamping arm from the work, the clamping arm is pivoted to facilitate the release of the work from the pallet. In this case also, however, the direction of pivoting cannot be changed by replacing the clamping arm.

Thus, by only replacing the clamping arm, as described above, the replacement of the work cannot be dealt with. As a result, in many cases, the pallet suited to the work must be newly provided. Accordingly, there were pallets corresponding to the kinds of the work.

Meanwhile, if the work is a heavy material such as the cylinder block, the weight of the pallet also necessarily increases. So where the work to be machined by the machining device is replaced, inconveniently, it takes a long time to replace the pallet on the transfer line. In addition, since the pallet is required for each model of the work, the place for keeping the pallets must be assured. Particularly, in the field having many kinds of works, inconveniently, it is difficult to assure the place for keeping the pallets.

SUMMARY OF THE INVENTION

One or more embodiments of the present invention provide an improved clamping apparatus which is capable of widely dealing with replacement of a work.

In accordance with one or more embodiments of the present invention, a clamping apparatus is provided with: a clamping case; a shaft mounted in the clamping case slidably in an axial direction of the shaft; a clamping arm attached to the shaft, wherein a work is disengageably clamped by the clamping arm; a first engaging member; a first elastic member; a first retainer; a second engaging member; a second elastic member having larger spring constant than the first elastic member; and a second retainer. In a first stroke, the first engaging member is engaged with the shaft by the first retainer and elastic force of the first elastic member is transmitted to the shaft. In a second stroke, the second engaging member is engaged with the shaft by the second retainer and elastic force of the second elastic member is transmitted to the shaft. In a releasing position, the shaft is not engaged with either of the first engaging member and the second engaging member, the first engaging member is held in the first retainer, the second engaging member is held in the second retainer and the shaft is detachable from the clamping case.

Further, in accordance with one or more embodiments of the present invention, the releasing position may be disposed between the first stroke and the second stroke.

Further, in accordance with one or more embodiments of the present invention, in the first stroke, the clamping arm may move from a maximum separating position where the clamping arm is separated from the work at a maximum to a position in vicinity of the work. In the second stroke, the clamping arm may move from a position in vicinity of the work to the work.

According to the clamping apparatus of the one or more embodiments, at the releasing position, the engagement of the first engaging member and second engaging member with the shaft is cancelled so that the first engaging member and second engaging member are held in the first retainer and the second retainer, respectively. Thus, the shaft can be removed from the clamping case. In changing the clamping position owing to replacement of the work, the shaft itself can be replaced. Accordingly, as compared with a conventional clamping apparatus in which only the clamping arm can be replaced, a great change in the height direction of the clamping position or the like can be easily dealt with.

In this way, without newly providing the pallet for each work, a large number of works can be dealt with using a single pallet. As a result, unlike before, a long time is not taken for replacement of the pallet. Further, the kinds of the pallet can be reduced so that the investment dedicated to the pallet required for each type of the work may be low. The place for keeping the pallet can be also reduced greatly.

Further, in accordance with one or more embodiments of the present invention, the clamping apparatus may be further provided with: a spiral groove formed on a surface of the shaft; and a guide member provided on the clamping case. In the first stroke, the guide member is inserted in the spiral groove and the spiral groove is guided by the guide member so that the shaft is pivotable. The guide member can be taken out from the spiral groove, when the shaft is detached from the clamping case.

If the spiral groove is formed on the surface of the shaft, the shaft can also be replaced by another shaft with a different spiral direction. By replacing the shaft, the pivoting direction of the shaft and clamping arm can also be changed so that a variety of replacements of the work can be dealt with. Further, in removing the shaft from the clamping case, the guide member can be taken out form the spiral groove. So, without carrying out the operation of removing the guide member, the shaft can be replaced.

Further, in accordance with one or more embodiments of the present invention, the clamping apparatus may further be provided with: a first pushing member for pushing the shaft upward; and a second pushing member for pushing the second retainer upward. The clamping apparatus is operated between: a first position where the first pushing member pushes the shaft to an upper dead center of the shaft and the second pushing member pushes the second retainer to an upper dead center of the second retainer; a second position where the first pushing member does not push the shaft and the second pushing member pushes the second retainer to the upper dead center of the second retainer; a third position where the first pushing member does not push the shaft and the second pushing member pushes the second retainer to a position between the upper dead center and a bottom dead center of the second retainer; and a fourth position where the first pushing member does not push the shaft and the second pushing member does not push the second retainer. The first stroke is located between the first position and the second position. The second stroke is located between the third position and the fourth position. The releasing position is the third position.

Further, in accordance with one or more embodiments of the present invention, the clamping apparatus may further be provided with: a first groove formed on the shaft; a second groove formed on the shaft; a first small-diameter segment; a first unlocking segment, wherein an inner diameter of the first unlocking segment is larger than an inner diameter of the first small-diameter segment, and the first unlocking segment is disposed lower than the first small-diameter segment; a second small-diameter segment; a second unlocking segment, wherein an inner diameter of the second unlocking segment is larger than an inner diameter of the second small-diameter segment, and the second unlocking segment is disposed upper than the second small-diameter segment. In the first and second positions, the first engaging member is positioned in the first small-diameter segment and engaged to the first groove and the second engaging member is positioned in the second unlocking segment. In the third position, the first engaging member is positioned in the first unlocking segment and the second engaging member is positioned in the second unlocking segment. In the fourth position, the first engaging member is positioned in the first unlocking segment and the second engaging member is positioned in the second small-diameter segment and engaged to the second groove.

Further, in accordance with one or more embodiments of the present invention, the clamping case may include: a sleeve, wherein the first retainer is slidable in the sleeve; and a lower case, wherein the second retainer is slidably guided by the lower case. The first small-diameter segment and the first unlocking segment are formed in the sleeve. The second small-diameter segment and the second unlocking segment are formed in the lower case.

Further, in accordance with one or more embodiments of the present invention, the first elastic member may be accommodated in the sleeve and urges the first retainer downward, and the second elastic member urges the second retainer downward.

Other aspects and advantages of the invention will be apparent from the following description and the appended claims.

Reference Numerals and Characters

1 . . . clamping apparatus, 2 . . . work (clamped object), 4 . . . clamping case, 5 . . . clamping shaft, 6 . . . clamping arm, 14 . . . first operating ball (first engaging member), 15 . . . retainer (first retainer), 18 . . . plunger (second retainer), 24 . . . second operating ball (second engaging member).

DETAILED DESCRIPTION OF THE EXEMPLARY EMBODIMENTS

Exemplary embodiments of the invention will be described with reference to the accompanying drawings.

Figure 1:
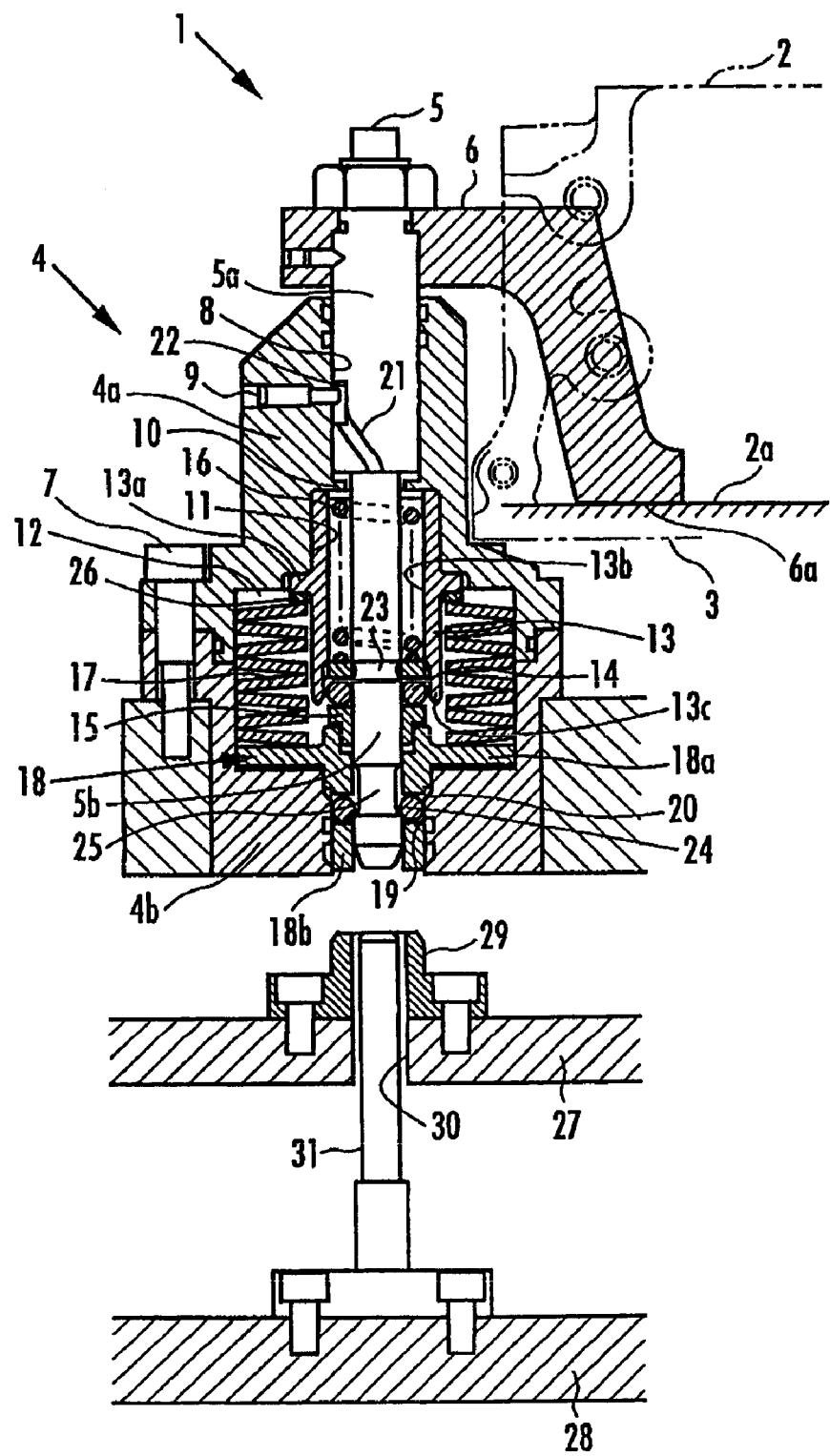
FIG. 1 is an explanatory sectional view showing a state (a fourth position) where a work 1 is clamped by a clamping apparatus according to an exemplary embodiment of the invention.

A clamping apparatus 1 according to this exemplary embodiment, as seen from FIG. 1, is an apparatus capable of firmly holding a work 2 on a pallet 3. The clamping apparatus 1 includes a substantially cylindrical clamping case 4, a clamping shaft 5 which projects externally from above the clamping case 4 and is movable in a predetermined width in an axial direction (vertical direction in FIG. 1) within the clamping case 4, and a clamping arm 6 secured to the tip of the clamping shaft 5 to press the work 2 against the pallet 3. FIG. 1 shows the state where the work 2 is being clamped on the pallet 3 by the clamping apparatus 1. It should be noted in this exemplary embodiment that the clamping direction is a direction from above toward below in FIG. 1.

The clamping case 4 is divided into an upper case 4a and a lower case 4b which are connected with each other by a bolt not shown and a connecting bolt 7, and is fixed to the pallet 3. The upper case 4a is provided with a bearing 8 which pivotally pivots a large-diameter shaft segment 5a of the clamping shaft 5 described later. To the bearing 8, a guide pin 9 (guide member) which projects inward is attached. Further, at the lower end of the bearing 8, a first spring holding segment 10 is formed which has a smaller inner diameter than that of the bearing 8 and with whose end a coil spring 16 described later is in contact. Beneath the first spring holding segment 10, an inserting/pressing-in segment 11 is formed which has a larger inner diameter than that of the first spring holding segment 10 and in which a sleeve 13 described later is firmly inserted or pressed.

The clamping case 4 has a housing chamber 12 for housing respective components. Specifically, the housing chamber 12 houses a nearly cylindrical sleeve 13 firmly pressed in the pressing-in segment 11 of the upper case 4a, a retainer 15 (first retainer) which is located between the clamping shaft 5 and sleeve 13 to pivotally retain first operating balls 14 (first engaging member), and a coil spring 16 (first elastic member) which is arranged between the upper end of the retainer 15 and the first spring holding segment 10 of the upper case 4a to urge the retainer 15 in the clamping direction by weak elastic force.

Further, the housing chamber 12 also houses a Belleville spring 17 composed of hollow-disk members arranged to encircle the outer periphery of the sleeve 13 and having strong elastic force, and a plunger 18 (second retainer) having a flange 18a for receiving the elastic force of the Belleville spring 17. The Belleville spring 17 is arranged between the upper case 4a and the plunger 18 through a washer 26 described later and a flange 13a of the sleeve 13. The lower case 4b includes a small-diameter segment 19 (a second small-diameter segment 19) to which the cylindrical segment 18b of plunger 18 is slidably attached and an unlocking segment 20 (a second unlocking segment 20) which is located above the small-diameter segment 19 and has a larger diameter than that of the small-diameter segment 19.

The clamping shaft 5 is pivoted on the bearing 8 of the upper case 4a, and also includes a large-diameter shaft segment 5a projecting above from the upper case 4a and a small-diameter shaft segment 5b passing through the sleeve 13, retainer 15 and cylindrical segment 18b of the plunger 18. As shown in FIG. 1, the large-diameter segment 5a has a spiral groove 21 inclined from the axial direction and a longitudinal groove 22 in the axial direction which are formed on the outer surface. The small-diameter segment 5b has a first disengageable groove 23 (a first groove 23) which the first operating balls 14 (first engaging member) are disengageable from, and is arc-shaped when viewed in a side section, and a second disengageable groove 25 (a second groove 25) which second operating balls 24 (second engaging member) are disengageable from and is nearly long-arc-shaped when viewed in the side section. The clamping arm 6 attached to the tip of the clamping shaft 5 has a clamping face 6a where the clamping position 2a of the work 2 is pressed in the direction of the pallet 3.

The sleeve 13 is nearly cylindrical, and has a flange 13a formed on the outer periphery so as to project outwardly. The portion above this flange 13a is inserted or pressed in the inserting/pressing-in segment 11 of the upper case 4a. The upper end of the Belleville spring 17 is kept in contact with the lower surface of the flange 13a through the washer 26. On the inner periphery of the sleeve 13, formed are a small-diameter segment 13b (a first small-diameter segment 13b) which is slightly larger in its inner diameter than the outer diameter of the coil spring 16 and an unlocking segment 13c (a first unlocking segment 13c) which is larger in its inner diameter than the small-diameter segment 13b in the vicinity of the lower end.

Figure 2:
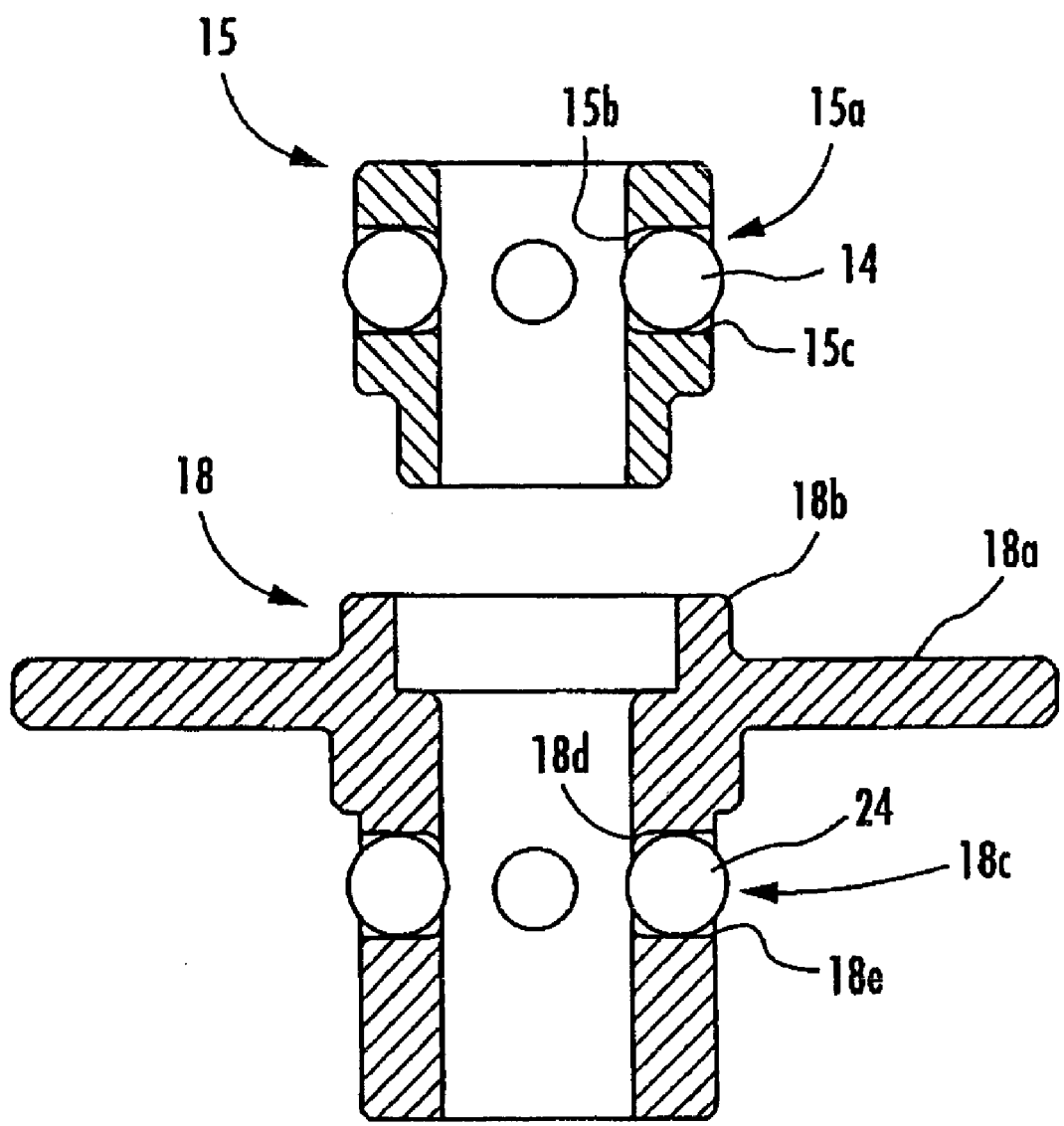
FIG. 2 is an explanatory sectional view showing a retainer and a plunger of the clamping apparatus shown in FIG. 1.

Next referring to FIG. 2, an explanation will be given of the retainer 15 and plunger 18. FIG. 2 is a sectional view of the retainer 15, plunger 18, first operating balls 14 and second operating balls 24 taken from the clamping apparatus 1 shown in FIG. 1.

The retainer 15 is a nearly cylindrical member, and has a passing-through recess 15a formed on its cylindrical wall, within which the first operating balls 14 are pivotally held. Concretely, as seen from FIG. 2, on its inner side of the passing-though recess 15a into which the small-diameter shaft segment 5b of the clamping shaft 5 is inserted, formed is an opening 15b which is smaller in its inner diameter than the outer diameter of the first operating ball 14 so that the first operating ball 14 does not drop toward the inner side. On the outer side of the passing-through recess 15a, formed is an opening 15c which is larger in its inner diameter than the outer diameter of the first operating ball 14. The lower end of the retainer 15 is partially inserted into the tip of the cylindrical segment 18b of the plunger 18.

The plunger 18 is cylindrical and includes a cylindrical segment 18b slidably provided on the inner wall of the small-diameter segment 19 of the lower case 4b and a hollow-disk-shaped flange 18a projecting outward from the vicinity of the upper end of the cylindrical segment 18b. The cylindrical segment 18b has a passing-through recess 18c formed on its cylindrical wall, within which the second operating balls 24 are pivotally held. Concretely, as seen from FIG. 2, on its inner side of the passing-though recess 18c into which the small-diameter shaft segment 5b of the clamping shaft 5 is inserted, formed is an opening 18d which is smaller in its inner diameter than the outer diameter of the second operating ball 24 so that the second operating ball 24 does not drop toward the inner side. On the outer side of the passing-through recess 18c, formed is an opening 18e which is larger in its inner diameter than the outer diameter of the second operating ball 24. The tip of the retainer 15 is partially inserted into the upper end of the cylindrical segment 18b.

The first operating ball 14 is larger in diameter than the interval between the small-diameter segment 13b of the sleeve 13 and the small-diameter shaft segment 5b of the clamping shaft 5, and also slightly smaller in diameter than the interval between the small-diameter segment 13b of the sleeve 13 and the first disengageable groove 23 of the clamping shaft 5. Further, the first operating ball 14 is slightly smaller in diameter than the interval between the unlocking segment 13c of the sleeve 13 and the small-diameter shaft segment 5b of the clamping shaft 5.

The second operating ball 24 is larger in diameter than the interval between the small-diameter segment 19 of the lower case 4b and the small-diameter shaft segment 5b of the clamping shaft 5, and also slightly smaller in diameter than the small-diameter segment 19 of the lower case 4b and the second disengageable groove 25 of the clamping shaft 5. Further, the second operating ball 24 is slightly smaller in diameter than the interval between the unlocking segment 20 of the lower case 4b and the small-diameter shaft segment 5b of the clamping shaft 5.

Further, below the clamping case 4 and the pallet 3, provided are a first pressing plate 27 and a second pressing plate 28 for driving the plunger 18 and clamping shaft 5. The first pressing plate 27 is provided with a pressing bush 29 (a second pushing member 29) having a cylindrical protrusion and pressing the plunger 18 from below. The second pressing plate 28 is provided with a pressing rod 31 (a first pushing member 31) which passes a through hole 30 formed in the first pressing plate 27 and internally passes the pressing bush 29 to press up the clamping shaft 5.

Figure 3A:
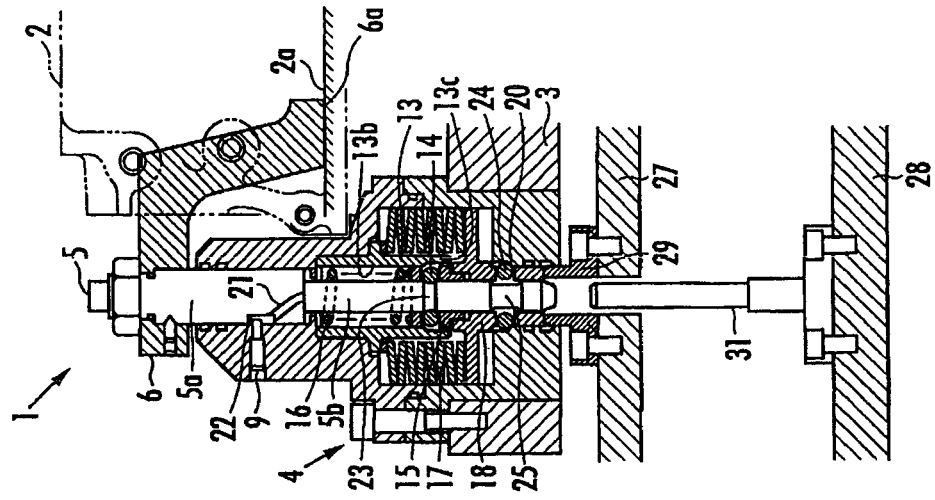
FIG. 3A is an explanatory sectional view showing the state where the clamping apparatus shown in FIG. 1 is in a first position.
Figure 3B:
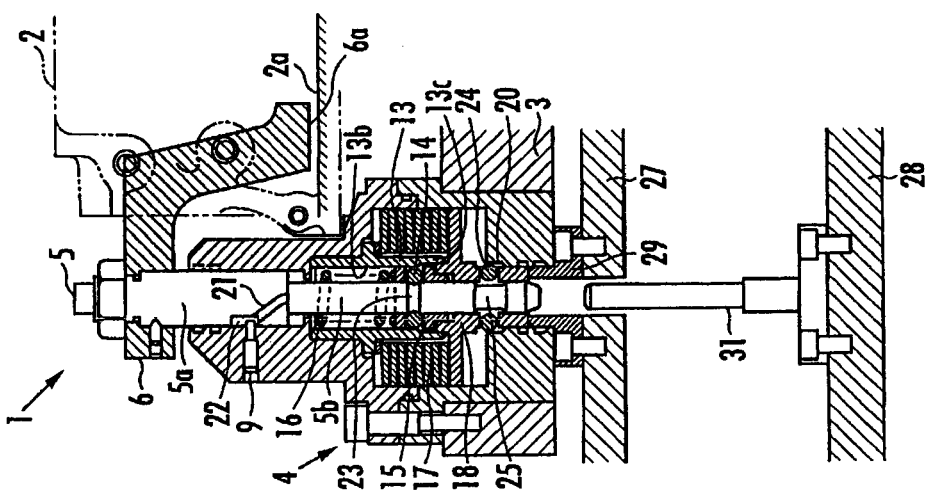
FIG. 3B is an explanatory sectional view showing the state where the clamping apparatus shown in FIG. 1 is in a second position.

In this exemplary embodiment, the elastic force of the coil spring 16 is about 118 N (about 12 Kgf) in the state of FIG. 3B. The elastic force of the Belleville spring 17 is about 2452 N (about 250 Kgf) in the state of FIG. 1. These elastic forces can be appropriately changed according to the work 2 to be clamped.

Figure 3C:
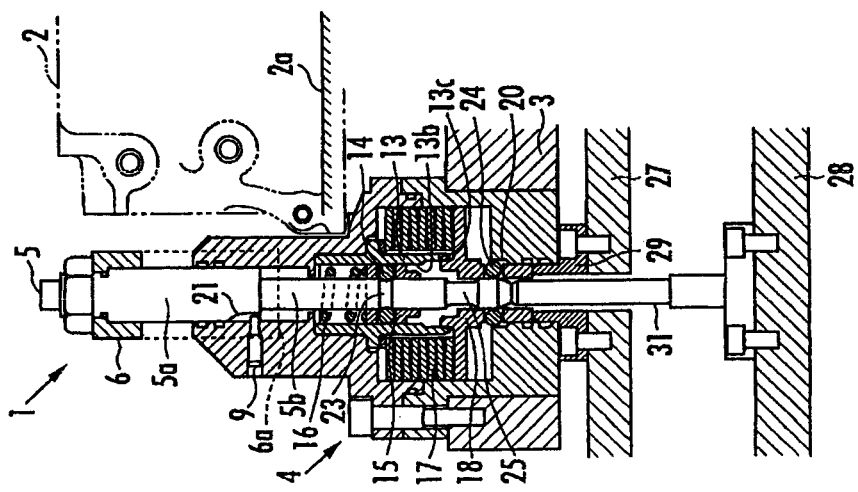
FIG. 3C is an explanatory sectional view showing the state where the clamping apparatus shown in FIG. 1 is in a fourth position.
Figure 4:
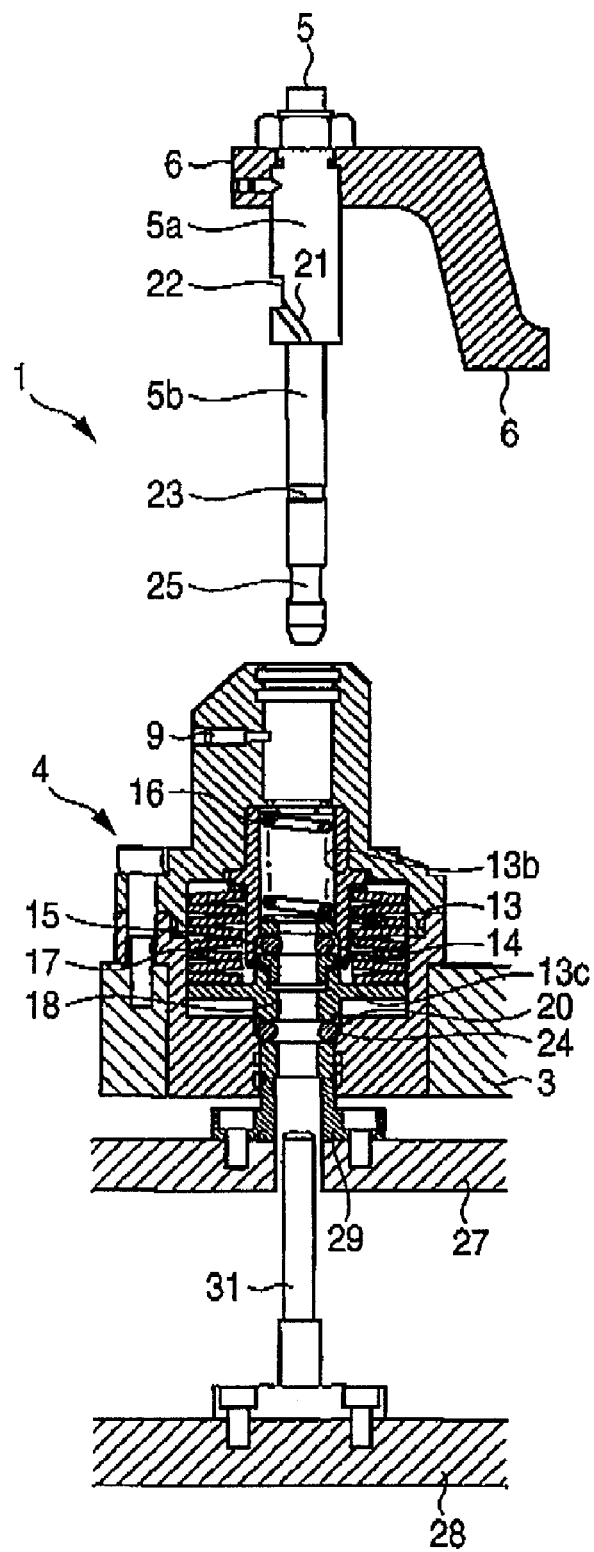
FIG. 4 is an explanatory sectional view showing a shaft detached from the clamping case.

Now referring to FIGS. 1, 3A, 3B, and 3C, and 4, an explanation will be given of the operation of clamping the work 2 by the clamping apparatus 1 according to this exemplary embodiment and also the operation of unclamping the work 2. FIG. 3A (first position) shows the state where the clamping arm 6 is located at the farthest position from the clamping position 2a of the work 2. FIG. 3B (second position) shows the state where the clamping shaft 5 has been fallen by a first stroke from the state of FIG. 3A. FIG. 3C (third position) shows the state where the clamping shaft 5 is located at a releasing position between the first stroke and the second stroke. The second stroke refers to a transient stroke from FIG. 3C to FIG. 1 (fourth position). FIG. 4 (third position) shows the state where the clamping shaft 5 is detached from the clamping case 4.

FIG. 3A shows the state where the clamping shaft 5 has been raised to the top stage and the work 2 has been unclamped. In this state, the first pressing plate 27 has been pressed up so that the plunger 18 has been pressed up by the pressing bush 29 attached to the pressing plate 27. The second operating balls 24 are located at the unlocking segment 20 of the lower case 4b so that they are disengaged from the second disengageable groove 25 of the clamping shaft 5.

On the other hand, the second pressing plate 28 has been also pressed up so that the clamping shaft 5 has been pressed up by the pressing rod 31 attached to the second pressing plate 28. Further, the first operating balls 14 are located at the small-diameter segment 13b of the sleeve 13 and partially engaged in the first disengageable groove 23 of the clamping shaft 5. Thus, the elastic force of the coil spring 16 acts on the clamping shaft 5 through the retainer 15 and the first operating balls 14. Against this elastic force, the clamping shaft 5 is moved upward by the pressing rod 31. In this case, since the elastic force of the coil spring 16 is as relatively small as about 118 N, a longer stroke can be taken. Thus, the clamping face 6a of the clamping arm 6 can be largely separated from the clamping position 2a of the work 2.

At this time, the clamping shaft 5 is in the state pivoted axially (clockwise in this exemplary embodiment) by about 60° by the spiral groove 21 from the state shown in FIG. 1. Thus, the tip of the clamping arm 6 is in the state oriented to this side in FIG. 3A. In clamping the work 2 by the clamping apparatus 1 according to this exemplary embodiment, in the state of FIG. 3A, the work 2 is set in the pallet 3, and thereafter this state is shifted in the order of FIG. 3B, FIG. 3C and FIG. 1.

The state of FIG. 3B represents the state where the clamping face 6a of the clamping arm 6 has approached the vicinity of the clamping position 2a of the work 2. The plunger 18 has been pressed up by the pressing bush 29 so that the second operating balls 24 are located at the unlocking segment 20 of the lower case 4b. Thus, the elastic force of the Belleville spring 17 does not act on the clamping shaft 5. On the other hand, the second pressing plate 28 is pressed downward so that the pressing rod 31 is not in contact with the clamping shaft 5.

The retainer 15 has been pressed up by the plunger 18 so that the first operating balls 14 are located at the small-diameter segment 13b of the sleeve 13. Thus, the elastic force of the coil spring 16 acts on the clamping shaft 5. In this way, in the state of FIG. 3B, only the elastic force of the coil spring 16 acts on the clamping shaft 5 and clamping arm 6.

When the state of FIG. 3A is shifted to the state of FIG. 3B, as the clamping shaft 5 descends, the clamping shaft 5 and clamping arm 6 are pivoted counterclockwise by 60° by the action of the spiral groove 21 and guide pin 9. Thus, the clamping face 6a of the clamping arm 6 move to immediately above the clamping position 2a of the clamping arm 6.

FIG. 3C represents the state where the first pressing plate 27 has moved by a short distance downward from the state of FIG. 3B so that the clamping arm 6 is brought into contact with the clamping position 2a of the work 2. The plunger 18 has been pressed up by the pressing bush 29 so that the second operating balls 24 are located at the unlocking segment 20 of the lower case 4b. Thus, the elastic force of the Belleville spring 17 does not act on the clamping shaft 5. On the other hand, since the second pressing plate 28 has been pressed down, the pressing rod 31 is not in contact with the clamping shaft 5.

The retainer 15 has been pressed up by the plunger 18, but the first operating balls 14 are located at the unlocking segment 13c of the sleeve 13. Therefore, the elastic force of the coil spring 16 does not act on the clamping shaft 5. In this way, in the state of FIG. 3C, the elastic forces of the Belleville spring 17 and the coil spring 16 do not act on the clamping shaft 5 and clamping arm 6. In this embodiment, the position of the clamping shaft 5 in FIG. 3C corresponds to the releasing position.

FIG. 1 represents the state where the clamping face 6a of the clamping arm 6 presses the clamping position 2a of the work 2 on the pallet 3 to clamp the work 2. In shifting from the state of FIG. 3B to that of FIG. 1, since the guide pin 9 moves within the longitudinal groove 22 of the clamping shaft 5, the clamping shaft 5 does not pivot.

In this state, the portion holding the second operating balls 24 of the plunger 18 has moved from the unlocking segment 20 to the small-diameter segment 19 so that the second operating balls 24 are pushed out to the side of the clamping shaft 5 and so the second operating balls 24 are engaged to the lower end of the second disengageable groove 25 of the clamping shaft 5. As a result, the strong elastic force of the Belleville spring 17 acts on the clamping face 6a of the clamping arm 6 through the plunger 18, second operating balls 24 and clamping shaft 5. Thus, the work 2 is firmly held on the pallet 3. At this time, since the first operating balls 14 are located at the unlocking segment 13c of the sleeve 13, they have been disengaged from the first disengageable groove 23. The elastic force of the coil spring 16, therefore, does not act on the clamping shaft 5.

That is, the clamping apparatus 1 is operated between a first position (a position shown in FIG. 3A), a second position (a position shown in FIG. 3B), a third position (a position shown in FIG. 3C) and a fourth position (a position shown in FIG. 1). In the first position, the first pushing member 31 pushes the shaft 5 to an upper dead center of the shaft 5, and the second pushing member 29 pushes the second retainer 18 to an upper dead center of the second retainer. In the second position, the first pushing member 31 does not push the shaft 5 and the second pushing member 29 pushes the second retainer 18 to the upper dead center of the second retainer. In the third position, the first pushing member 31 does not push the shaft 5 and the second pushing member 29 pushes the second retainer 18 to a position between the upper dead center and a bottom dead center of the second retainer. In the fourth position, the first pushing member 31 does not push the shaft 5 and the second pushing member 29 does not push the second retainer 18. The first stroke is a stroke between the first position and the second position. The second stroke is a stroke between the third position and the fourth position. Further, the third position is the releasing position.

As understood from the description hitherto made, in clamping the work 2 by the clamping apparatus 1 according to this exemplary embodiment, in the state of FIG. 3A, the work 2 is set on the pallet 3; and as seen from FIG. 3B to FIG. 1, the second pressing plate 28 and the first pressing plate 27 are moved downward. Thus, the work 2 is clamped on the pallet 3. On the other hand, in unclamping the work 2 by the clamping apparatus 1 according to this exemplary embodiment, in contrast to the above operation in clamping, the operating state is shifted from FIG. 1 to FIG. 3C, FIG. 3B and FIG. 3A. Thus, the work 2 is unclamped. In the state of FIG. 3A is removed from the pallet 3.

Next, in the clamping apparatus 1 according to this exemplary embodiment, an explanation will be given of the operation of replacing the clamping shaft 5 and clamping arm 6 when the clamping position 2a is changed owing to replacement of the work 2. Where the work 2 is replaced, the clamping shaft 5 is moved to the releasing position. In this state, the clamping shaft 5 is removed from the clamping case 4. The clamping shaft 5 and clamping arm 6 are replaced by other things. More specifically, this operation carried out as follows.

First, after the work 2 has been removed in FIG. 1, only the first pressing plate 27 is raised to press the plunger 18. Thus, as seen from FIG. 3C, the second operating balls 24 are moved from the small-diameter segment 19 of the lower case 4b to the unlocking segment 20 thereof. The first operating balls 14 are also held by not by the small-diameter segment 13b but by the unlocking segment 13c. In this state, in the clamping shaft 5, the first disengageable groove 23 and first operating balls 14 are not engaged with each other; and the second disengageable groove 25 and second operating balls 24 are also not engaged with each other.

In this state of FIG. 3C, by pulling the clamping shaft 5 upward, the clamping shaft 5 and clamping arm 6 can be removed from the clamping case 4, as is shown in Fig.4. At this time, the first operating balls 14 are held by the retainer 15 and the second operating balls 24 are held by the plunger 18. Therefore, when the clamping shaft 5 is removed, these members do not come off.

Further, since the spiral groove 21 formed on the surface of the clamping shaft 5 is guided by the guide pin 9, the clamping shaft 5 and clamping arm 6 are pivoted by about 60°. In addition, since the lower end of the spiral groove 21 is continuous to the small-diameter shaft segment 5b, when the clamping shaft 5 is raised, the guide pin 9 is moved from the spiral groove 21 to the small-diameter shaft segment 5b. Thus, the clamping shaft 5 can be removed from the clamping case 4.

Next, the clamping shaft and clamping arm for replacement are prepared (not shown). Before replacement, the clamping arm 6 has been pivoted counterclockwise for unclamping. However, where the clamping arm 6 must be pivoted clockwise owing to the replacement of the work 2, the clamping shaft provided with the spiral groove so that it pivots clockwise in unclamping is employed.

The clamping shaft for replacement may have a different projecting degree from the clamping case 4 when it is mounted therein from that of the clamping shaft 5, and may have a different direction of the spiral groove as described above. In mounting the clamping shaft for replacement in the clamping case 4, the clamping shaft is inserted into the clamping case 4 so that the guide pin 9 is inserted into the lower end of the spiral groove. In this state, the clamping shaft is pressed down so that it is inserted to the same position as the state of FIG. 3C. Thus, mounting of the clamping shaft and clamping arm is completed.

By further pressing up the first pressing plate 27 from the state of FIG. 3C, as seen from FIG. 3B, the first operating balls 14 are moved from the unlocking segment 13c of the sleeve 13 to the small-diameter segment 13b so that the first operating balls 14 are engaged in the first disengageable groove of the clamping shaft. Further, as seen from FIG. 3A, by raising the second pressing plate 28 to push up the clamping shaft by the pressing rod 31, the clamping arm is placed in the unclamped state. Thereafter, with the work 2 set on the pallet 3, it is clamped on the pallet 3 in accordance with the above procedure in clamping.

In this exemplary embodiment, the coil spring 16 and Belleville spring 17 were adopted as the elastic member. However, in place of the coil spring 16, another elastic member having a long stroke and relatively weak elastic force may be adopted. In place of the Belleville spring 17, another elastic member having strong elastic force may be adopted. Further, in the exemplary embodiment, the work 2 was clamped directly by the clamping arm 6. However, without being limited to this, the jig (not shown) used for clamping the work 2 may be clamped.

In replacing the clamping shaft 5 and clamping arm 6, although not shown, an operator pulled up them from above. However, they may be replaced using an articulated robot. In this case, they can be replaced even in a narrow space where a person cannot enter, or under an environment in which cutting oil of a machine tool disperses.

In the exemplary embodiment, the clamping shaft 5 and plunger 18 were moved by the first pressing plate 27 and second pressing plate 28. However, without being limited to this, they may be moved using e.g. oil pressure as long as the clamping shaft 5 is detachable. Further, the sleeve 13 was inserted or pressed in the inserting/pressing-in segment 11 of the upper case 4a. However, without being limited to this, the sleeve 13 may be secured by screwing or the like, and the sleeve 13 and upper case 4a may be formed integrally.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A clamping apparatus, comprising:
a clamping case;
a shaft mounted in the clamping case for sliding movement in an axial direction of the shaft, wherein said shaft is pushed with a first pushing member;
a clamping arm attached to the shaft, wherein a work is disengageably clamped by the clamping arm;
a first engaging member disposed within the clamping case;
a first retainer, wherein the first engaging member is engaged with the shaft by the first retainer in a first stroke;
a first elastic member with a first spring constant and providing a first elastic force, wherein the first elastic force of the first elastic member is transmitted to the shaft through the first retainer in the first stroke, and wherein the first elastic member coaxially receives a first portion of the shaft;
a second engaging member disposed within the clamping case;
a second retainer slidably disposed in the clamping case, wherein said second retainer is pushed with a second pushing member, and wherein the second engaging member is engaged with the shaft by the second retainer in a second stroke; and
a second elastic member with a second spring constant and providing a second elastic force, wherein the second elastic force of the second elastic member is transmitted to the shaft through the second retainer in the second stroke and the second spring constant is larger than the first spring constant, and wherein the second elastic member coaxially receives a second portion of the shaft,
wherein said first pushing member is a rod that is aligned with said second pushing member, said second pushing member being a circular protrusion that is detached from said clamping case, and said shaft is actuated by contact with the first pushing member;
wherein in a releasing position in which the shaft is not engaged with either the first engaging member and the second engaging member the first engaging member is held in the first retainer, the second engaging member is held in the second retainer and the shaft is adapted to be detachable from the clamping case.

2. The clamping apparatus according to claim 1, wherein the releasing position is disposed between the first stroke and the second stroke.

3. The clamping apparatus according to claim 2, wherein the clamping arm moves from a maximum separating position where the clamping arm is separated from the work at a maximum to a position in vicinity of the work in the first stroke, and
the clamping arm moves from a position in vicinity of the work to the work in the second stroke.

4. The clamping apparatus according to claim 1, further comprising:
a spiral groove formed on a surface of the shaft; and
a guide member provided on the clamping case,
wherein the guide member is inserted in the spiral groove and the spiral groove is guided by the guide member so that the shaft is pivotable, in the first stroke, and
the guide member is able to be taken out from the spiral groove when the shaft is detached from the clamping case.

5. The clamping apparatus according to claim 1,
wherein the clamping apparatus is operated between:
a first position where the first pushing member pushes the shaft to an upper dead center of the shaft and the second pushing member pushes the second retainer to an upper dead center of the second retainer;
a second position where the first pushing member does not push the shaft and the second pushing member pushes the second retainer to the upper dead center of the second retainer;
a third position where the first pushing member does not push the shaft and the second pushing member pushes the second retainer to a position between the upper dead center and a to bottom dead center of the second retainer; and
a fourth position where the first pushing member does not push the shaft and the second pushing member does not push the second retainer,
wherein the first stroke is between the first position and the second position,
the second stroke is between the third position and the fourth position, and
the releasing position is the third position.

6. The clamping apparatus according to claim 5, further comprising:
a first groove formed on the shaft;
a second groove formed on the shaft;
a first small-diameter segment;
a first unlocking segment, wherein an inner diameter of the first unlocking segment is larger than an inner diameter of the first small-diameter segment, and the first unlocking segment is disposed lower than the first small-diameter segment;
a second small-diameter segment; and
a second unlocking segment, wherein an inner diameter of the second unlocking segment is larger than an inner diameter of the second small-diameter segment, and the second unlocking segment is disposed upper than the second small-diameter segment,
wherein the first engaging member is positioned in the first small-diameter segment and engaged to the first groove and the second engaging member is positioned in the second unlocking segment, in the first and second positions,
he first engaging member is positioned in the first unlocking segment and the second engaging member is positioned in the second unlocking segment, in the third position, and
the first engaging member is positioned in the first unlocking segment and the second engaging member is positioned in the second small-diameter segment and engaged to the second groove, in the fourth position.

7. The clamping apparatus according to claim 6, wherein the clamping case includes:
a sleeve, wherein the first retainer is slidable in the sleeve; and
a lower case, wherein the second retainer is slidably guided by the lower case,
wherein the first small-diameter segment and the first unlocking segment are formed in the sleeve, and
the second small-diameter segment and the second unlocking segment are formed in the lower case.

8. The clamping apparatus according to claim 7, wherein the first elastic member is accommodated in the sleeve and urges the first retainer downward, and
the second elastic member urges the second retainer downward.

9. A clamping apparatus, in which an object to be clamped is disengageably clamped by a clamping arm provided to a shaft mounted in a clamping case slidably in an axial direction, said shaft pushed by a first pushing member, the clamping apparatus comprising:
- a first elastic member with a first spring constant and providing a first elastic force;
- a first retainer for transmitting the first elastic force of the first elastic member to the shaft by engaging a first engaging member to the shaft in a first stroke from a maximum separating position between the clamping arm and the object to be clamped to a position in vicinity of the object to be clamped; and
- a second elastic member with a second spring constant and providing a second elastic force, wherein the second spring constant is larger than the first spring constant;
- a second retainer for transmitting the second elastic force of the second elastic member to the shaft by engaging a second engaging member to the shaft in a second stroke in which the clamping arm moves from the position in vicinity of the object to be clamped to the object to be clamped, wherein the second retainer is pushed by a second pushing member,
- wherein a releasing position in which the shaft is not engaged with either of the first engaging member and the second engaging member is disposed between the first stroke and the second stroke,
- wherein a first pushing member is a rod that is aligned with a second pushing member, said second pushing member being a circular protrusion that is detached from said clamping case, and said shaft is actuated by contact with the first pushing member;
- in the releasing position, the first engaging member is held in the first retainer, the second engaging member is held in the second retainer, and the shaft is adapted to be detachable from the clamping case.

10. The clamping apparatus according to claim 9, wherein
- a spiral groove is formed on a surface of the shaft,
- a guide member inserted in the spiral groove is provided on the clamping case,
- the spiral groove is guided by the guide member so that the shaft is pivotable, in the first stroke, and
- the guide member is capable of being taken out from the spiral groove when the shaft is detached from the clamping case.

* * * * *

UNITED STATES PATENT AND TRADEMARK OFFICE
CERTIFICATE OF CORRECTION

PATENT NO. : 7,621,514 B2
APPLICATION NO. : 11/279468
DATED : November 24, 2009
INVENTOR(S) : Okubo et al.

It is certified that error appears in the above-identified patent and that said Letters Patent is hereby corrected as shown below:

Column 11, Line 43, (Claim 1), delete "member the" and insert -- member, the --.

Column 12, Line 45, (Claim 6), delete "he" and insert -- the --.

Signed and Sealed this

Thirtieth Day of March, 2010

David J. Kappos
*Director of the United States Patent and Trademark Office*